(12) United States Patent
Briggs et al.

(10) Patent No.: US 7,299,821 B2
(45) Date of Patent: Nov. 27, 2007

(54) RESERVOIR OF FUEL DELIVERY MODULE HAVING VALVE PROTECTION STRUCTURE

(75) Inventors: Paul F. Briggs, Grand Blanc, MI (US); Jeffery J. Milton, Lake Orion, MI (US)

(73) Assignee: Siemens VDO Automotive Corporation, Auburn Hills ( * ) Notice: Subject to any disclaimer, the term of this patent is extended or adjusted under 35 U.S.C. 154(b) by 540 days.

(21) Appl. No.: 10/888,415

(22) Filed: Jul. 9, 2004

(65) Prior Publication Data
US 2005/0103805 A1    May 19, 2005

Related U.S. Application Data
(60) Provisional application No. 60/520,014, filed on Nov. 14, 2003.

(51) Int. Cl.
*F02M 37/10* (2006.01)
*E03B 11/00* (2006.01)
(52) U.S. Cl. .................. 137/574; 137/546; 123/514; 123/511
(58) Field of Classification Search .............. 137/574, 137/576, 565.22, 546; 123/514, 511
See application file for complete search history.

(56) References Cited
U.S. PATENT DOCUMENTS 4,928,657 A * 5/1990 Asselin ................ 123/514
5,050,567 A * 9/1991 Suzuki ................. 123/514
5,699,773 A * 12/1997 Kleppner et al. .......... 123/510
6,155,793 A * 12/2000 Tuckey et al. ............. 417/87
6,491,028 B1 * 12/2002 Gaston et al. ............ 123/509
6,951,208 B2 * 10/2005 Milton ................. 123/509

FOREIGN PATENT DOCUMENTS

| DE | 10028458 A1 | 12/2001 |
| WO | WO 89/07712 A | 8/1989 |
| WO | 4438094 A1 | 5/1996 |

* cited by examiner

*Primary Examiner*—John Rivell
*Assistant Examiner*—Andrew J. Rost

(57) ABSTRACT

A reservoir 10 is provided for mounting to a bottom of a fuel tank of a vehicle. The reservoir includes wall structure 13 coupled with a bottom to define an interior space 17. The bottom has an internal surface 27 within the interior space, an external surface 15, and an opening 12 in the bottom. A check valve 11 is associated with the opening. Valve protection structure 16 extends from the external surface and is provided continuously about the entire perimeter of the bottom to define a plurality of tortuous paths P for fuel flow from the tank to the opening. Feet structure 26 extend from the external surface to contact the bottom of the tank. A plurality of pockets 30 are provided in the internal surface 27 of the bottom for collecting foreign particles that may enter the reservoir.

18 Claims, 4 Drawing Sheets

RESERVOIR OF FUEL DELIVERY MODULE HAVING VALVE PROTECTION STRUCTURE

This application is based on U.S. Provisional Application No. 60/520,014, filed on Nov. 14, 2003, and claims the benefit thereof for priority purposes.

FIELD OF THE INVENTION

The invention relates to automotive fuel delivery modules and, more particularly, to a reservoir of the module that has structure for protecting a valve of the module from large particles that may cause the valve to stay in an open position.

BACKGROUND OF THE INVENTION

A fuel delivery module is a device inside a fuel tank that allows a vehicle to perform under conditions of low fuel remaining in the fuel tank. The module includes a reservoir that is kept continuously full by, for example, a jet pump, even when the remainder of the tank is nearly empty. For these devices to function properly, an opening in the bottom of the reservoir is typically provided to allow fuel to flow from the tank into the reservoir. When the vehicle is turned off, this opening must be closed to contain fuel in the reservoir so that the fuel pump can receive fuel when the vehicle is restarted. A valve is used to keep the fuel from back-flowing from the reservoir to the fuel tank.

The valve in the reservoir can be contaminated and made not to function by large particles of dirt or debris that cause the valve to stick open. Thus, there is a need to prevent large particles from reaching the valve.

SUMMARY OF THE INVENTION

An object of the invention is to fulfill the need referred to above. In accordance with the principles of the present invention, this objective is obtained by providing a reservoir for a fuel delivery module. The reservoir is constructed and arranged to be mounted with respect to a bottom of a fuel tank of a vehicle. The reservoir includes wall structure coupled with a bottom to define an interior space. The bottom has an internal surface within the interior space and an external surface. The bottom has at least one opening therein. A valve is associated with the opening and is constructed and arranged to permit fuel contained in the tank to flow into the reservoir and, under certain circumstances, to prevent fuel in the reservoir from flowing back to the tank. Valve protection structure extends from the external surface and provided continuously about the entire perimeter of the bottom. The valve protection structure defines a plurality of tortuous paths for fuel flow from the tank to the opening. Feet structure extends from the external surface a distance greater than an extent of the valve protection structure from the external surface such that when the reservoir is mounted with respect to the tank, the feet structure contact the bottom of the tank and the valve protection structure is disposed in spaced relation with respect to the bottom of the tank. A plurality of pockets is provided in the internal surface of the bottom. The pockets define at least a portion of the valve protection structure that extends from the external surface of the bottom. Thus, fuel must flow through the tortuous path into the reservoir, with the pockets collecting foreign particles that may enter the reservoir. Hence there is less chance of foreign particles clogging the valve.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
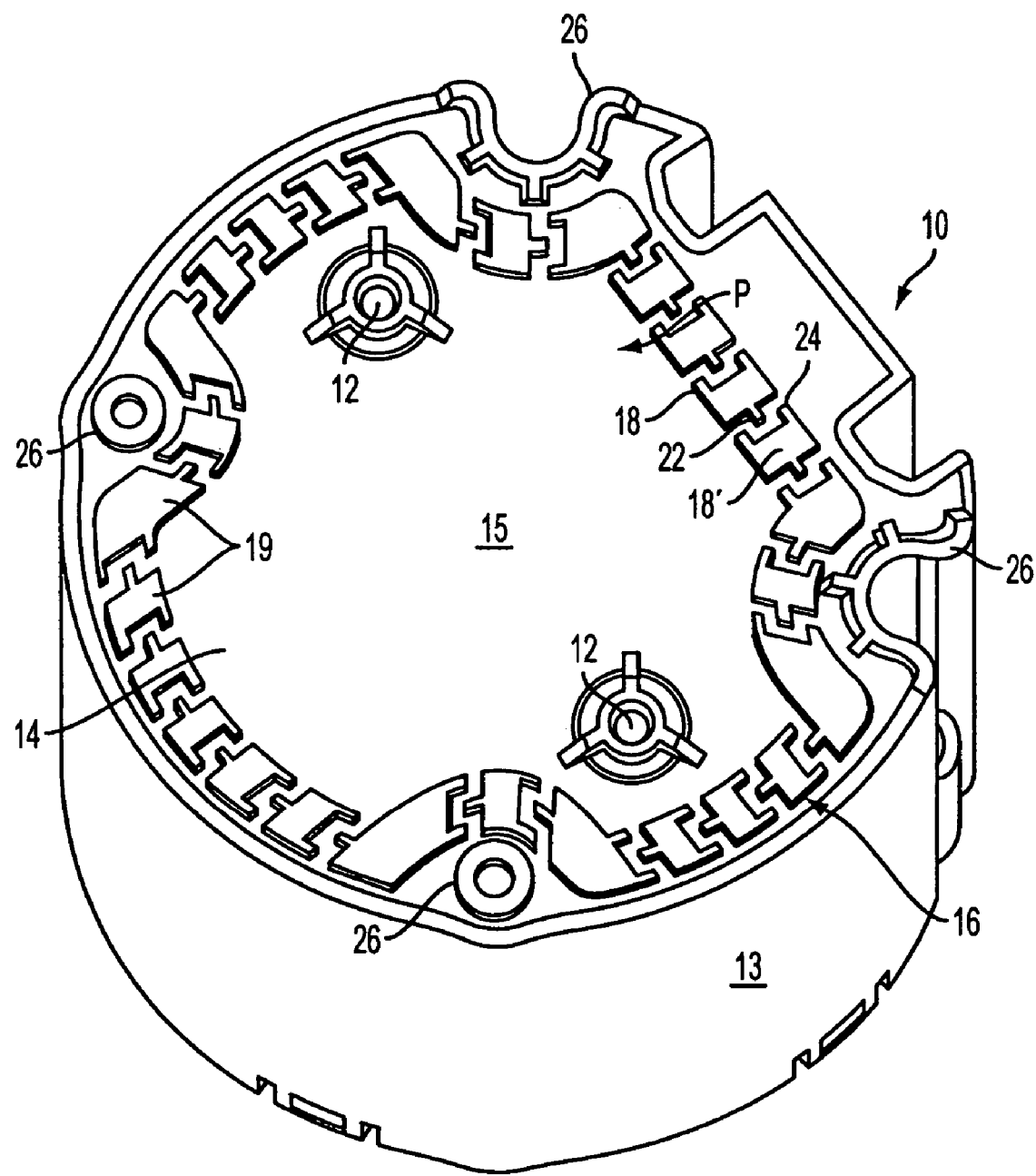
FIG. 1 is a perspective view of a bottom of a reservoir of a fuel delivery module having valve protection structure protruding therefrom in accordance with the invention.
Figure 2:
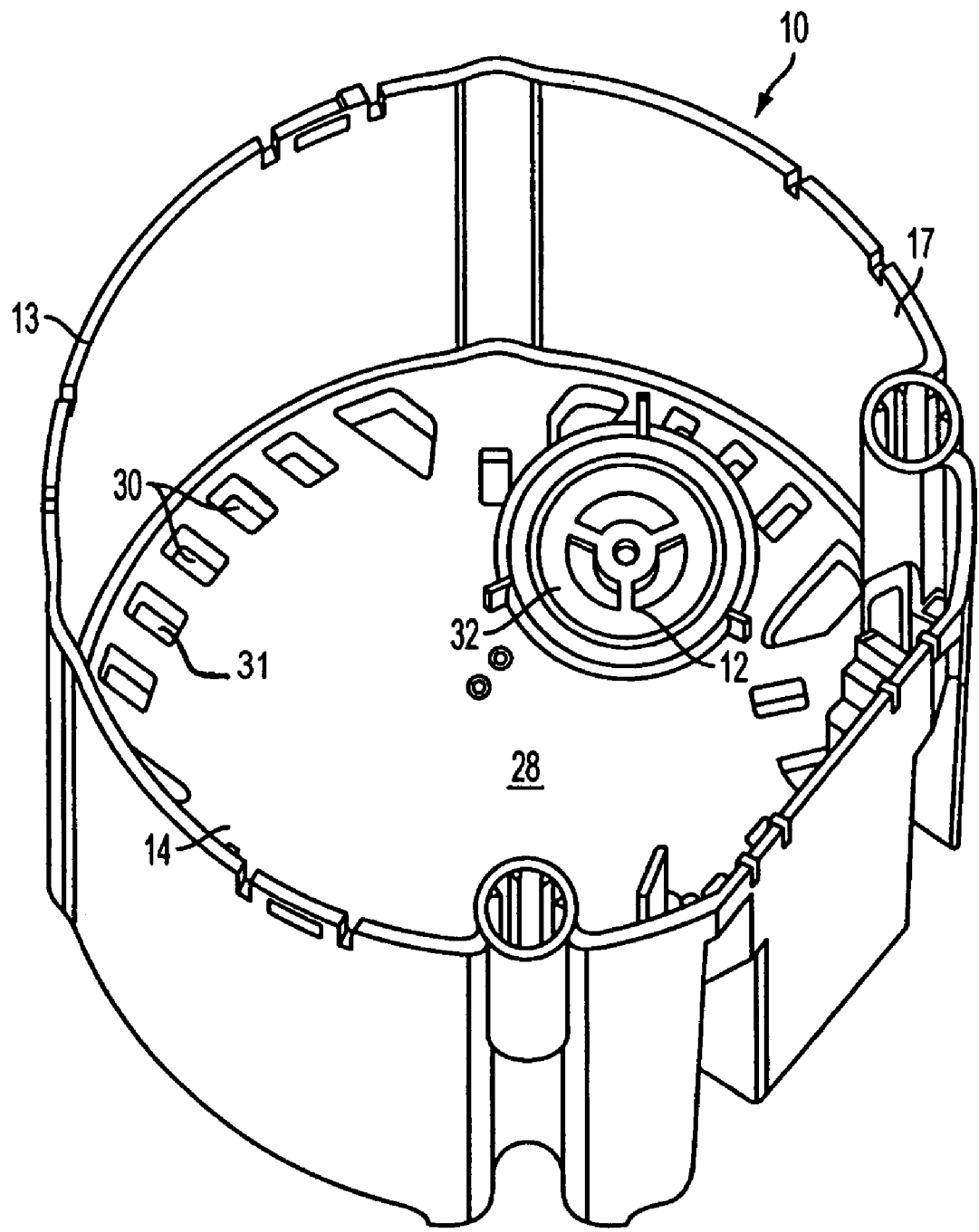
FIG. 2 is a perspective view of the top of the reservoir of FIG. 1.

With reference to FIGS. 1 and 2, a reservoir of a fuel delivery module is shown, generally indicated at 10, in accordance with the principles of the invention. The reservoir 10 is mounted within a fuel tank (not shown) of a vehicle and is associated with a fuel pump (not shown) to supply fuel to an engine of the vehicle in the conventional manner. The reservoir 10 includes generally cylindrical wall structure 13 that is joined with a bottom 14 to define an interior space 17.

As shown in FIG. 2, at least one opening 12 is provided in the bottom 14 of the reservoir 10 to permit fuel to enter the reservoir 10 from the tank. Two openings 12 are shown in the embodiment. A conventional valve 11 (FIG. 3), such as a check valve, is associated with each opening 12 to permit fuel to flow from the tank to the reservoir but prevent back flow of fuel to the tank when the vehicle is turned off.

In order to hinder the flow of dirt or other foreign particles to the opening 12 and cause the associated valve 11 to stick in an open position, valve protection structure, generally indicated at 16, protrudes from the external surface 15 of bottom 14 of the reservoir 10. In the illustrated embodiment, the valve protection structure is provided continuously about the entire perimeter of the bottom 14 so as to define a plurality of tortuous paths P of fuel flow from the tank to the openings 12. Thus, the openings 12 are surrounded by the valve protection structure. The valve protection structure 16 can include a series of adjacent members 18 each having a pair of generally circumferentially extending first elements 24 disposed in spaced relation at one end thereof and a generally circumferentially extending second element 22 at an end opposite the one end thereof, such that the second element 22 of one member 18 faces the first elements 24 of an adjacent member 18' as to define the path P.

Figure 3:
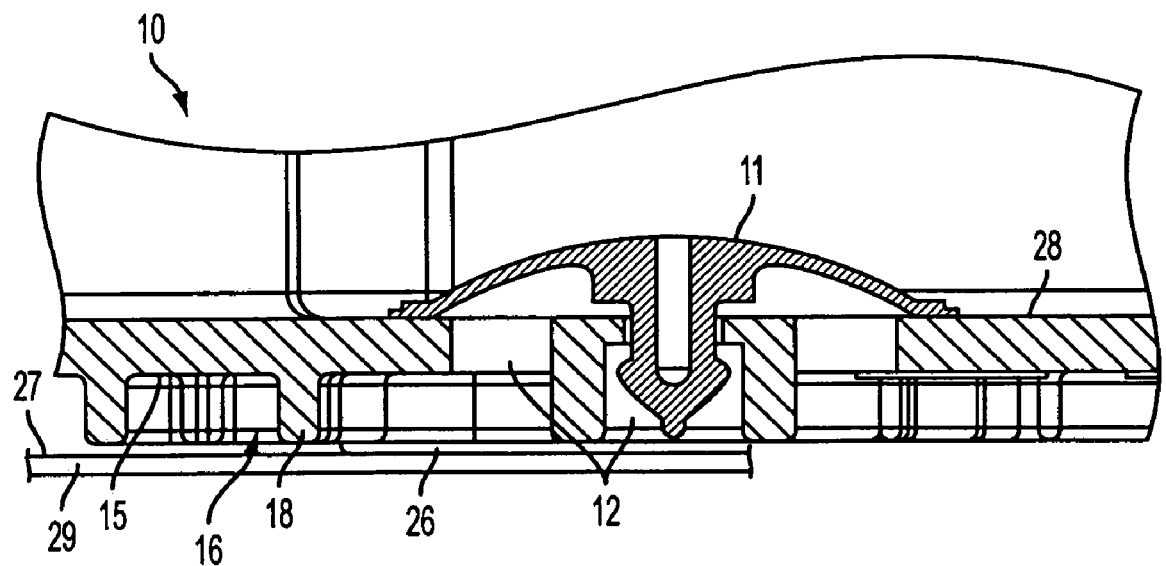
FIG. 3 is a sectional view of a valve associated with an opening in a bottom of the reservoir of the invention.

The reservoir 10 includes feet structure 26 extending from the external surface 15 of bottom 14. The feet structure 26 extend a distance from the surface 15 greater than the that of the valve protection structure 16 so that the feet structure 26 and not the valve protection structure 16 contact the bottom 27 of the fuel tank 29 (FIG. 3). This ensures that sufficient flow of fuel can occur between the bottom 27 of the fuel tank 29 and the external surface 15 of the reservoir and through the valve protection structure 16.

With reference to FIG. 2, an internal surface 28 of the bottom 14 of the reservoir 10 includes a plurality of pockets 30 therein. Each pocket 30 has a bottom including an internal bottom surface 31 and an external bottom surface 19 (FIG. 1). Each internal bottom surface 31 is disposed in the interior space 17 and below the internal surface 28 and each external bottom surface 19 forms at least part of the protruding members 18, 18' extending from the external surface of the bottom 14 of reservoir 10. The pockets advantageously collect dirt or other foreign particles in the fuel that that may have entered reservoir 10. Thus, the particles can collect in the pockets 30 so as to have less of a chance of clogging the check valve 11 associated with opening 12. The internal surface 28 of the bottom 14 of the reservoir 10 also defines an aspiration region 32, the function of which will be explained below.

The filling of the reservoir 10 occurs via a jet pump (not shown) that is driven by fuel returning from the engine or directly from the fuel pump (not shown). The jet pump aspirates fuel through the opening 12 and valve 11 to the aspiration region 32. The aspirated fuel is pre-filtered by its flow through the valve protection structure 16 so that the likelihood of clogging of the check valve 11 is reduced when fuel is drawn into the openings 12. Furthermore, if foreign particles happen to pass through the openings 12, they can collect in the pockets 30 in the reservoir and not float around to perhaps clog the valve 11.

Figure 4:
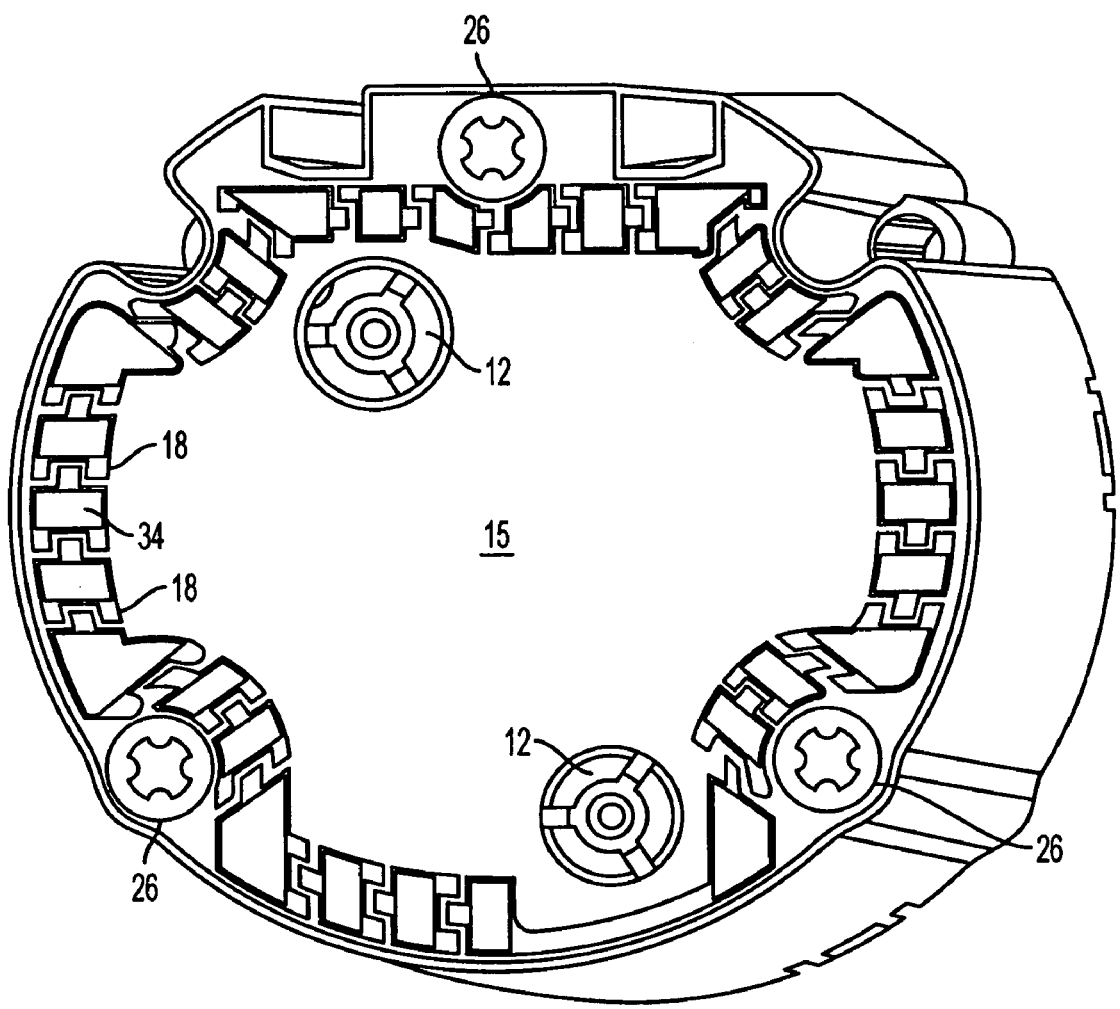
FIG. 4 is perspective view of a reservoir of a fuel delivery module having valve protection structure in accordance with another embodiment of the invention.

FIG. 4 is perspective view of a reservoir of a fuel delivery module having valve protection structure in accordance with another embodiment of the invention. As shown in FIG. 1, each protruding member 18, 18' of the valve protection structure includes a planar surface 19 that is spaced from the bottom 15. In the embodiment of FIG. 4, however, each protruding member 18 of the valve protection structure defines an enclosed pocket 34. Thus, the bottom of each pocket 34 can be considered to be the same surface as the bottom 15 of the reservoir 12. Otherwise, the structure of FIG. 4 is substantially the same as that of FIG. 1. By providing the external pockets, foreign particles in the fuel tank can collect in the pockets 34 so as not to reach the openings 12. Internal pockets (not shown in FIG. 4) can also be provided, as disclosed with reference to FIG. 2, to collect foreign particles that may enter the reservoir 12.

The fuel delivery module including a jet pump can be, for example, of the type disclosed in U.S. Pat. No. 6,478,014, the contents of which is hereby incorporated into the present specification by reference.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A reservoir for a fuel delivery module, the reservoir being constructed and arranged to be mounted with respect to a bottom of a fuel tank of a vehicle, the reservoir comprising:

wall structure coupled with a bottom to define an interior space, the bottom having an internal surface within the interior space and an external surface, the bottom having at least one opening therein, a valve associated with said at least one opening and constructed and arranged to permit fuel contained in the tank to flow into the reservoir and, under certain circumstances, to prevent fuel in the reservoir from flowing back to the tank, valve protection structure extending from the external surface and provided continuously about the entire perimeter of the bottom, the valve protection structure defining a plurality of tortuous paths for fuel flow from the tank to said at least one opening, feet structure extending from the external surface a distance greater than an extent of the valve protection structure from the external surface such that when the reservoir is mounted with respect to the tank, the feet structure contact the bottom of the tank and the valve protection structure is disposed in spaced relation with respect to the bottom of the tank, and a plurality of pockets in the internal surface of the bottom, each pocket having a bottom including an internal bottom surface and an external bottom surface, each internal bottom surface being disposed in the interior space and below the internal surface and each external bottom surface defining at least a portion of the valve protection structure that extends from the external surface of the bottom, the pockets being constructed and arranged to collect foreign particles in fuel that may enter the reservoir.

2. The reservoir of claim 1, wherein the valve protection structure surrounds said at least one opening.

3. The reservoir of claim 2, wherein the valve protection structure includes a series of adjacent members, each member having a pair of generally circumferentially extending first elements disposed in spaced relation at one end thereof and a generally circumferentially extending second element at an end opposite the one end thereof such that the second element of one member faces the first elements of an adjacent member as to define the tortuous path.

4. The reservoir of claim 1, wherein the pockets are constructed and arranged to collect foreign particles in fuel that enters the interior space.

5. The reservoir of claim 1, wherein a pair of openings is provided and a valve is associated with each opening.

6. The reservoir of claim 5, wherein the valve protection structure surrounds each opening.

7. The reservoir of claim 1, wherein the valve is a check valve.

8. A reservoir for a fuel delivery module, the reservoir being constructed and arranged to be mounted with respect to a bottom of a fuel tank of a vehicle, the reservoir comprising:

wall structure coupled with a bottom to define an interior space, the bottom having an internal surface within the interior space and an external surface, the bottom having at least one opening therein, means, associated with said at least one opening, for permitting fuel contained in the tank to flow into the reservoir and, under certain circumstances, for preventing fuel in the reservoir from flowing back to the tank, protection means, extending from the external surface and provided continuously about the entire perimeter of the bottom, for defining a plurality of tortuous paths for fuel flow from the tank to said at least one opening, and means, extending from the external surface a distance greater than an extent of the protection means from the external surface for mounting the reservoir with respect to a tank, the means for mounting being constructed and arranged such that when the reservoir is mounted with respect to the tank, the means for mounting contact the bottom of the tank and the protection means is disposed in spaced relation with respect to the bottom of the tank, and means, extending below the internal surface of the bottom, for collecting foreign particles that may enter the interior space.

9. The reservoir of claim 8, wherein the protection means surrounds said at least one opening.

10. The reservoir of claim 9, wherein protection means includes a series of adjacent members, each member having a pair of generally circumferentially extending first elements disposed in spaced relation at one end thereof and a generally circumferentially extending second element at an end opposite the one end thereof such that the second element of one member faces the first elements of an adjacent member as to define the tortuous path.

11. The reservoir of claim 9, wherein the means for permitting and preventing is a check valve.

12. The reservoir of claim 11, wherein a pair of openings is provided and a check valve is associated with each opening.

13. The reservoir of claim 12, wherein the protection means surrounds each opening.

14. The reservoir of claim 8, wherein means for collecting are pockets in the internal surface of the bottom, the pockets defining at least a portion of the protection means that extends from the external surface of the bottom.

15. A method of reducing clogging of a valve of a reservoir in a fuel tank of a vehicle, the reservoir comprising wall structure coupled with a bottom to define an interior space, the bottom having an internal surface within the interior space and an external surface, the bottom having at least one opening therein, a valve associated with said at least one opening and constructed and arranged to permit fuel contained in the tank to flow into the reservoir and, under certain circumstances, to prevent fuel in the reservoir from flowing back to the tank, valve protection structure extending from the external surface and provided continuously about the entire perimeter of the bottom, the valve protection structure defining a plurality of tortuous paths for fuel flow from the tank to said at least one opening, feet structure extending from the external surface a distance greater than an extent of the valve protection structure from the external surface, a plurality of pockets in the interior space with each pocket having an internal bottom surface extending below the internal surface of the bottom, the pockets defining at least a portion of the valve protection structure that extends from the external surface of the bottom, the method including:

mounting the reservoir to the fuel tank so that the feet structure contact a bottom of the fuel tank and the valve protection structure is disposed in spaced relation with respect to the bottom of the fuel tank so that fuel may be drawn from the fuel tank into the reservoir through the tortuous paths, and when fuel is drawn from the fuel tank through the tortuous paths and into the reservoir, collecting, in the pockets, foreign particles in the fuel that enter the reservoir.

16. A reservoir for a fuel delivery module, the reservoir being constructed and arranged to be mounted with respect to a bottom of a fuel tank of a vehicle, the reservoir comprising:

wall structure coupled with a bottom to define an interior space, the bottom having an internal surface within the interior space and an external surface, the bottom having at least one opening therein, a valve associated with said at least one opening and constructed and arranged to permit fuel contained in the tank to flow into the reservoir and, under certain circumstances, to prevent fuel in the reservoir from flowing back to the tank, valve protection structure extending from the external surface and provided continuously about the entire perimeter of the bottom, the valve protection structure defining a plurality of tortuous paths for fuel flow from the tank to said at least one opening, and defining a plurality of enclosed pockets external to the reservoir constructed and arranged to collect foreign particles contained in fuel in the tank, and feet structure extending from the external surface a distance greater than an extent of the valve protection structure from the external surface such that when the reservoir is mounted with respect to the tank, the feet structure contact the bottom of the fuel tank and the valve protection structure is disposed in spaced relation with respect to the bottom of the tank.

17. The reservoir of claim 16, wherein the valve protection structure surrounds said at least one opening.

18. The reservoir of claim 16, wherein the valve protection structure includes a plurality of protruding members, each protruding member defining one of the enclosed pockets.

* * * * *